United States Patent [19]

Hansen

[11] 4,072,160

[45] Feb. 7, 1978

[54] SCORED REVERSE BUCKLING RUPTURE DISC ASSEMBLY

[75] Inventor: Franklin A. Hansen, Raytown, Mo.

[73] Assignee: Continental Disc Corporation, Riverside, Mo.

[21] Appl. No.: 735,830

[22] Filed: Oct. 26, 1976

[51] Int. Cl.² .......................................... F16K 17/16
[52] U.S. Cl. ................................. 137/68 R; 220/89 A
[58] Field of Search ............................. 137/68 R-71; 220/89 A

[56] References Cited

U.S. PATENT DOCUMENTS

| 2,576,431 | 11/1951 | White | 220/89 A |
| 3,484,817 | 12/1969 | Wood | 220/89 A |
| 3,834,580 | 9/1974 | Ludwig et al. | 137/68 R X |
| 3,922,767 | 12/1975 | Solter et al. | 137/68 R X |

FOREIGN PATENT DOCUMENTS 578,008  6/1946  United Kingdom .............. 220/89 A Primary Examiner—Martin P. Schwadron
Assistant Examiner—Richard Gerard
Attorney, Agent, or Firm—Fishburn, Gold & Litman

[57] ABSTRACT

A safety pressure relief device of the reverse buckling type includes a puncturing element and a rupture disc having a groove or score line formed in the flange portion of the disc. The score line does not materially affect the rated pressure of the device during normal operation, and functions as a backup safety feature by providing a line of weakness along which the disc will tear if the pressure relief device is accidentally placed in a backward or reversed orientation with respect to the process, and/or if the cutting blades are inadvertently omitted from the rupture disc assembly.

12 Claims, 9 Drawing Figures

SCORED REVERSE BUCKLING RUPTURE DISC ASSEMBLY

This invention relates to safety pressure relief devices and more particularly to improvements in reverse buckling rupture discs.

The principal objects of the present invention are: to provide a reverse buckling rupture disc assembly having a groove or score line formed in the flange portion thereof for relieving pressure in a safe manner, even when the device has been installed backwards in the pressure vessel, and/or the cutting blades have been omitted therefrom; to provide such a rupture disc wherein the score line does not materially affect the rated pressure at which the disc will reverse buckle under normal operating conditions; to provide such a rupture disc wherein the score line is positioned on what surface of the disc flange associated with the disc concave surface; to provide such a rupture disc wherein the score line extends in a substantially circular manner about the flange, and is positioned concentrically therewith for predictable tearing action; to provide such a rupture disc wherein the flange includes an unscored connecting portion disposed between the ends of the score line for inhibiting disc fragmentation; to provide such a rupture disc wherein each of the score line ends are in the shape of a dimple having a substantially hemispherical configuration for improved tearing characteristics; to provide such a rupture disc wherein the score line is formed by non-mechanical milling such that the same is free of work hardened portions which could interfere with predicted operation; and to provide such a rupture disc which is economical to manufacture, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

Figure 1:
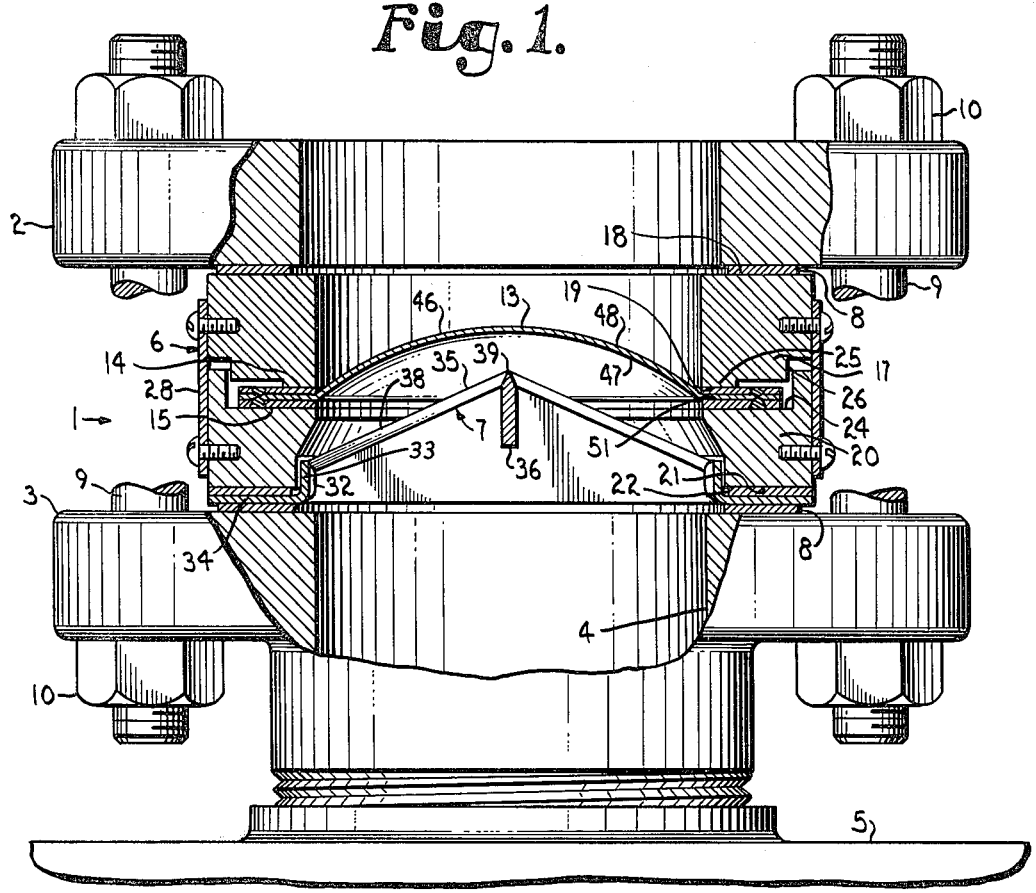
FIG. 1 is a side elevational view of a pressure relief device embodying this invention, having portions thereof broken away and being installed between pressure line flanges in a reversed or backward condition.
Figure 2:
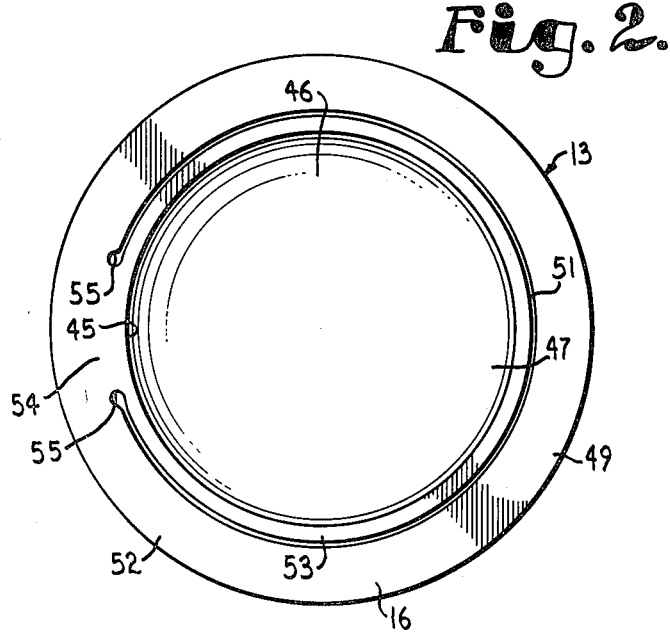
FIG. 2 is a bottom plan view of a rupture disc embodying this invention and being shown disassembled from the device.
Figure 3:
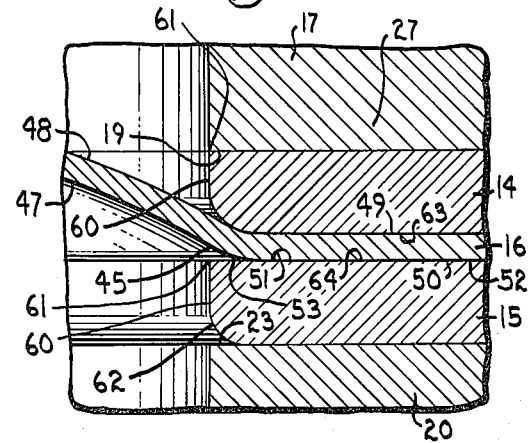
FIG. 3 is an enlarged fragmentary vertical cross-sectional view of the device taken through a peripheral portion thereof.

Referring more in detail to the drawings:

The reference numeral 1 generally designates a safety pressure relief device assembly embodying this invention. The device 1 is adapted for insertion between a pair of mounting flanges 2 and 3 which form a pressure relief passageway 4 in communication with a pressure vessel 5. The device comprises a safety disc unit 6 and a separable and cooperating puncturing element, such as knife blade unit 7. A gasket 8 is positioned on both sides of the device, and a plurality of circumferentially spaced fasteners urge the disc and knife units together between the mounting flanges 2 and 3 to form an airtight seal therebetween.

The safety disc 6 comprises a rupture member 13 in the shape of a diaphragm, having a pair of seating rings 14 and 15 disposed on opposite sides of the rupture member flange portion 16. The illustrated rings 14 and 15 are each welded to the flange portion 16 at a point disposed adjacent to the periphery thereof. An inlet ring 17 is positioned between the flange 2 and the seating ring 14 and transmits compressive forces therebetween. The first surface 18 of the ring 17 abuts and seals against gasket 8, and a surface 19 thereof abuts and seals against the seating ring 14. An outlet ring 20 is positioned between the mounting flange 3 and the seating ring 15 and transmits compressive forces therebetween. The first surface 21 of the outlet ring 20 abuttingly engages a gasket 22 for sealing contact therewith and the second surface 23 abuts the seating ring 15. A plurality of suitably shaped fasteners such as threaded studs 9 and nuts 10, are positioned through aligned apertures in the flanges 2 and 3, and exert substantially uniform compressive forces on the device 1. In this example, the outlet ring 20 is provided with a recessed portion 24 in which the rupture disc 13 is centeringly positioned. The inlet ring 17 has one end 25 thereof shaped for cooperating engagement with the recessed outlet ring 20 and includes a shoulder portion 26. Further, the second surface 19 of the inlet ring 17 has had the radially outer portion thereof removed to concentrate the clamping forces on the radially inward portion of the flange 16. Side mounted bars 28 serve as preassembly hardware to maintain the inlet and outlet rings in a proper relationship during preliminary handling.

The knife blade unit 7 includes a mounting ring 32 having an interior tubular portion 33 and a flange portion 34 projecting radially therefrom. The tubular portion 33 and the flange portion 34 are, in this example, integrally connected and of a relatively thin material. A pair of intersecting knife blades 35 and 36 are, in the illustrated structure, secured to the tubular portion 33 by means such as welds, and extend thereacross. The knife blades have cutting edges 38 directed toward the rupture disc member 13 and slope toward a central, sharpened point 39.

The rupture disc 13 is of the reverse buckling type and includes a transition portion 45 which integrally connects a bulged portion 46 with the flange portion 16. The bulged portion 46 displays a concave surface 47 and a convex surface 48, and the flange portion 16 presents associated surfaces 49 and 50 respectively. The bulged portion 46 is of a precise and uniform thickness to insure predictable reverse buckling action.

A groove or score line 51 is formed in one of the surfaces of the flange 16 and forms a line of weakness along which the disc will tear under pressure in the event that the device is improperly installed between the flanges 2 and 3. In this example, the score line 51 is formed in the surface 50 of the flange 16 which is oriented away from the process to avoid oxidation when the disc is used with processes involving corrosive chemicals and the like. Also, the score line 51 extends about the flange 16 in a substantially circular manner, and is positioned concentrically with and generally adjacent to the transition portion 45. The illustrated score line has its radially innermost edge positioned a relatively short distance from the transition portion's point of tangency with the flange portion. The flange is divided by the score line into first and second annular portions 52 and 53 respectively. The first portion 52 is large relative to the second portion 53, and the score line is preferably formed by a non-mechanical milling process such as chemical milling or electrical discharge milling, such that the walls surrounding the score line are free of work hardened portions. The flange 16 includes an unscored connecting portion 54 disposed between the ends 55 of the score line to inhibit disc fragmentation upon rupture, whereby the disc assumes a toilet seat configuration. The ends 55 of the score line each preferably include a dimple or enlarged imperforate indentation extending into but not through the flange and having a substantially hemispherical shape, and the illustrated score line has a substantially semi-circular, lateral, cross-sectional shape.

The seating rings 14 and 15 support the disc for proper reverse buckling, and each has an inner peripheral surface 60 with first and second corners 61 and 62 respectively. In this example, the rings are similarly shaped for production uniformity, and the first corner 61 is square and the second corner 62 is rounded. Further, the square corner 61 of the seating ring 15 is disposed adjacent to the concave surface 47 of the disc, and the rounded corner 62 of the other seating ring 14 is positioned adjacent to the convex surface 48 of the disc and partially follows the curvature of the transitional portion 45. In the illustrated structure, the adjacent surfaces 63 and 64 of the seating rings 14 and 15 respectively, each engage both the first and second annular portions 52 and 53 of the rupture disc flange. This engagement insures that the disc will properly reverse buckle about the edge 61 of the ring 15, and that the area immediately surrounding the score line 51 is subject only to tension loading. In this manner, the score line does not materially affect the rated operating pressure of the properly installed device. Since the annular portion 53 is relatively short in radial extent, the disc can move inward upon bearing at the score line, as described below. The disc member 13 of the pressure relief device has a rated pressure at which the bulged portion 46 thereof normally reverses itself and is thereby impaled on the knife blades 35 and 36 to allow pressure communication between the vessel 5 and another atmosphere, generally, the environment. According to this design, the convex side 48 of the rupture disc must face the positive pressure side of the operation, which is typically that side facing the process. The bulged portion 46 of the disc is arcuately shaped, has a thickness of precision uniformity, and is without any score, groove or similr line of weakness therein. Since the reverse buckling action of the disc is determined by the shape and condition of the bulged portion alone, the disc will reverse buckle at the rated pressure. Further, since the score line 51 is disposed in the flange portion 16 of the disc, and is engaged by at least a portion of each setting ring 14 and 15, the line of weakness is exposed only to tension forces, and will therefore not materially effect the pressure at which the disc will reverse buckle.

Figure 4:
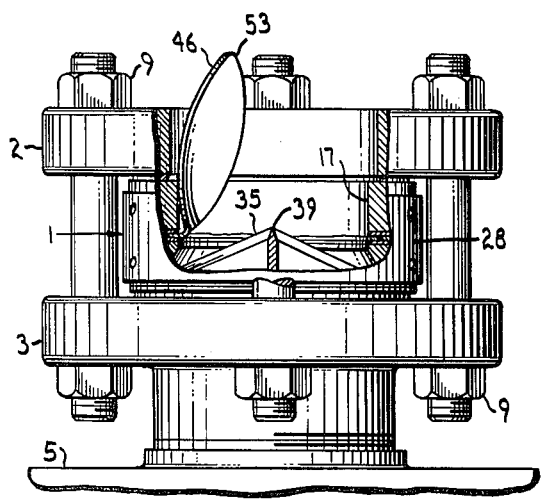
FIG. 4 is a side elevational view of the device in the reversed installation condition, having portions thereof broken away to illustrate a ruptured condition of the disc.
Figure 6:
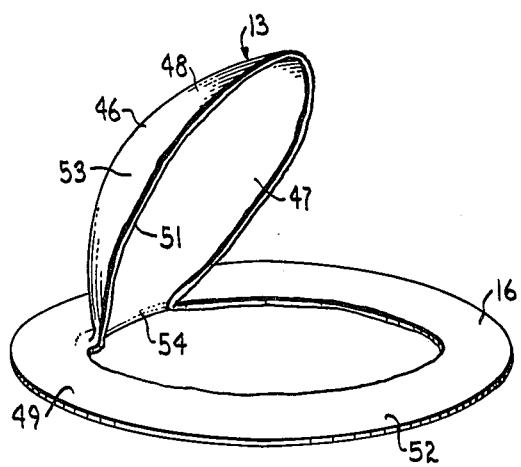
FIG. 6 is a perspective view of the disassembled disc in a ruptured condition.
Figure 5:
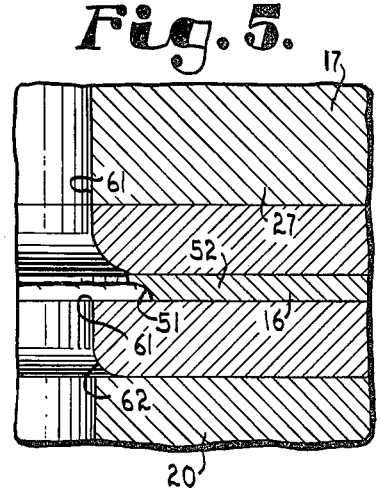
FIG. 5 is an enlarged fragmentary vertical cross-sectional view of the device in a ruptured condition.

In the event that the device is installed backward, or in a reverse orientation to the intended design, such that the concave side 47 of the rupture disc faces the process, the prior art disc will not rupture until it reaches a pressure far above the rated pressure of the relief device, thereby exposing the pressure vessel to high, damaging stresses. In the present device, if the operator inadvertently places the disc unit 6 in a reverse orientation to the process, as illustrated in FIG. 1, the disc will rupture at a pressure only slightly higher than the rated pressure of the device, in the manner illustrated in FIGS. 4 and 5, thereby preventing damage to the pressure vessel. Under these circumstances, the disc will tear along the line of weakness created therein by the score line 51. The second annular portion 53 of the flange has a small width, and is pulled easily from between the adjacent seating rings 4 and 15 (FIG. 5). The unscored connecting portion 54 (FIG. 6) inhibits the bulged portion 46 from being propelled into the environment.

Figure 8:
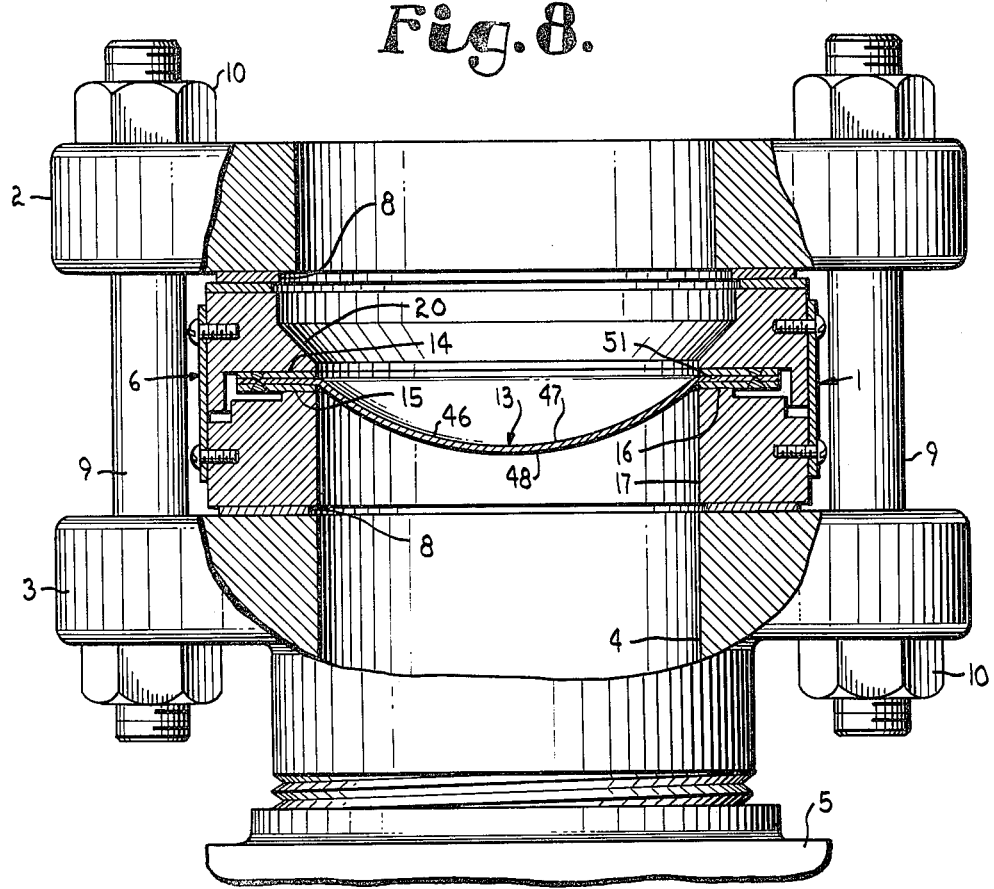
FIG. 8 is a side elevational view of a rupture disc assembly similar to FIG. 1, but wherein the disc is properly oriented, and the knife blades have been inadvertently omitted.
Figure 9:
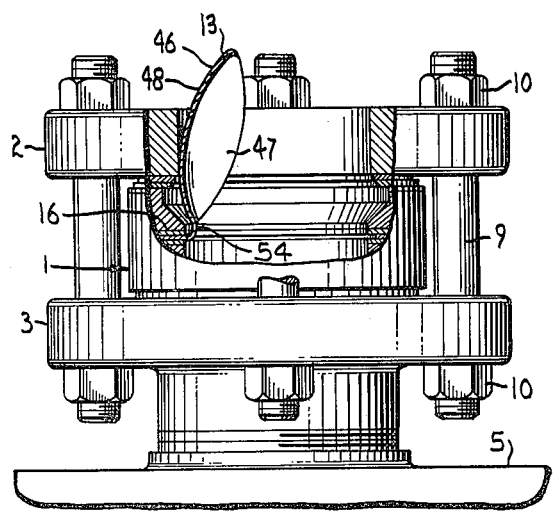
FIG. 9 is a side elevational view of the assembly of FIG. 8, with the center portion thereof broken away to illustrate the ruptured condition of the disc member.

The safety pressure relief device illustrated in FIG. 8 shows the structure wherein the knife blade unit 7 has been inadvertently omitted from the assembly. If the dsic 13 has been properly oriented with respect to the process, as shown in FIG 8, the disc will reverse buckle in the normal manner, causing high tension forces to be exerted upon the flange, and then tear along the score line 51 to assume the toilet seat configuration of FIG. 9. If the blades are omitted, and the disc is installed in a reverse orientation to the process, as shown in FIG. 1 but without the knife blades, the disc 13 will rupture along the score line 51 in the previously described manner.

Figure 7:
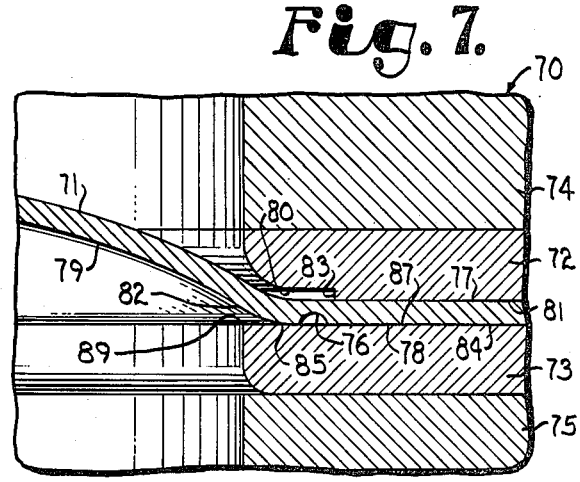
FIG 7 is an enlarged fragmentary vertical cross-sectional view of a second embodiment of the present invention wherein the radially inward portion of the rupture disc flange is in an unclamped or free condition.

The reference numeral 70, (FIG. 7) generally designates a second embodiment of the present invention having a rupture disc member 71, first and second seating rings 72 and 73, and inlet and outlet rings 74 and 75 between which the disc and seating rings are clamped. A groove or score line 76, as above described, is formed in the flange portion 77 of the disc on a first side 78 thereof associated with the concave surface of the disc. In this embodiment, the radially inward portion of the seating ring 72 is cut away to form a relief or step portion 80 producing a clamping surface 81 spaced apart from the transition portion 82 of the disc and engaging the flange 77 thereof. The innermost edge 83 of the step portion 80 engages the first annular portion 84 of the flange at a point disposed outwardly of and adjacent to the score line 76, whereby the second annular portion 85 of the flange is not clamped between the seating rings 72 and 73. As a result, upon score line rupture, the disc portion 85 more readily pulls inwardly to effect passageway opening. Since the first side 78 of the flange is supported by contact with the flat surface 87 of the seating ring 73, the disc, in normal operation configuration, will reverse buckle in essentially the usual manner by bending over the squared corner 89 of the seating ring 73. Since the space between the step portion 80 and the flange 77 is very small, the flange is subject, nearly exclusively, to tension forces.

It is to be understood that while certain forms of this invention have been illustrated and described, it is not to be limited to the specific form or arrangement of parts herein described and shown, except insofar as such limitations are included in the following claims.

What is claimed and desired to secure by Letters Patent is:

1. In a safety pressure relief device including a reverse buckling disc having a retaining flange portion and a central bulged portion connected thereto by a transition portion, said bulged portion having a convex and a concave surface, and said disc having a rated pressure on said convex side at which said bulged portion reverses itself for cutting on an adjacently positioned puncturing element, the improvement comprising:
   a. a score line formed on the flange portion of said disc; said score line creating a line of weakness in said flange portion whereby pressure applied to said bulged portion which fails to produce cutting on said puncturing element causes said disc to tear along said score line.

2. A device as set forth in claim 1 wherein:
   a. said flange portion includes a first side thereof associated with said concave surface; and
   b. said score line is formed in the first side of said flange portion.

3. A device as set forth in claim 1 wherein:
   a. said score line extends in a substantially circular manner about said flange portion and is disposed concentrically with and adjacent to said transition portion.

4. A device as set forth in claim 3 wherein:
   a. said score line divides said flange portion into first and second annular portions; said second annular portion being disposed inwardly of said first annular portion and having a narrow width relative thereto.

5. A device as set forth in claim 1 wherein:
   a. said flange portion has a flat, annular shape.

6. A device as set forth in claim 1 wherein:
   a. said score line has a substantially semi-circular cross-sectional shape.

7. A device as set forth in claim 1 wherein:
   a. said score line includes a first end thereof positioned a spaced apart distance from a second end thereof;
   b. said flange portion includes an unscored connecting portion disposed between the ends of said score line for preventing disc fragmentation.

8. A device as set forth in claim 7 wherein:
   a. said score line ends each include an imperforate indentation having a substantially hemispherical shape.

9. A device as set forth in claim 1 wherein:
   a. said score line is defined by a side wall portion of said flange; and
   b. said side wall is free of work hardened portions and formed by non-mechanical milling.

10. A device as set forth in claim 1 wherein:
    a. said device includes first and second collars positioned on opposing sides of said flange;
    b. said score line divides said flanged into first and second annular portions being disposed radially outwardly and inwardly respectively thereof;
    c. said flange portion includes a first side thereof associated with said concave surface;
    d. one of said collars abuts the first side of said flange and frictionally engages the first and second annular portions thereof; and including
    e. means clamping said disc between said first and second collars.

11. A device as set forth in claim 10 wherein:
    a. said flange includes a second side thereof associated with said convex surface; and
    b. the other of said collars abuts the second side of said flange and frictionally engages the first annular portion thereof.

12. A device as set forth in claim 11 wherein:
    a. the other of said collars frictionally engages the second annular portion of said flange.

* * * * *